2,988,471
STABILIZATION OF ACTIVE CHLORINE CONTAINING SOLUTIONS

Robert J. Fuchs, Clark Township, and Irwin A. Lichtman, Oradell, N.J., assignors to Food Machinery and Chemical Corporation, New York, N.Y., a corporation of Delaware
No Drawing. Filed Jan. 2, 1959, Ser. No. 784,470
14 Claims. (Cl. 167—17)

This invention relates to the stabilization of aqueous solutions containing active chlorine, and particularly to the stabilization of such solutions during exposure to sunlight or in contact with metals, by the addition of a chemical of the class consisting of cyanuric acid, ammelide and their salts.

Chlorine, sodium hypochlorite and calcium hypochlorite have been widely used to kill pathogenic bacteria and to prevent their growth in potable water supplies and in swimming pools, and in general in sterilizing solutions. While the aqueous solutions are effective bactericides, and are fairly stable in the dark, they have the serious drawback of decomposing more or less rapidly on exposure to sunlight and in contact with metals such as iron or copper, which normally are present in the equipment handling the solutions, or being sterilized. The rate of de composition is particularly high in the very dilute solutions used in potable water supplies and swimming pools. In swimming pools, for example, where it is desired to maintain an available chlorine content of about 0.4 to 1.5 parts per million (p.p.m.), it is generally necessary to add many times this amount of available chlorine in the course of an ordinary sunny day. Corresponding amounts of acid or alkali also have to be used to keep the pH at the desired level of about 7 to 8.

It is the principal object of the present invention to reduce the rate of loss of active chlorine in aqueous solutions containing such chlorine, so that both the expense of the chemicals and the expense of controlling the available chlorine content and pH of such solutions is drastically reduced.

According to the present invention, the loss of active chlorine in aqeous systems exposed to sunlight or to certain metals is substantially reduced by adding to the aqueous solution a material selected from the class consisting of cyanuric acid, ammelide, and their salts, in such quantity that its concentration by weight, expressed as acid equivalent, is greater than the available chlorine concentration in the solution.

With the typical very low concentrations of available chlorine used in swimming pools and drinking water (ca. 1 p.p.m.), 1 to 2 parts per million of cyanuric acid will cut down the rate of active chlorine loss by as much as one half; but further improvement in stability is obtained up to about 50 p.p.m. of cyanuric acid, the rate of loss being ⅓ to ¼ the unstabilized rate at 10 p.p.m. cyanuric acid, and as low as ⅒ or less at 50 p.p.m. Above 50 p.p.m., no advantage is gained.

With more concentrated solutions of active chlorine, somewhat lower ratios of cyanuric acid concentration to available chlorine concentration produced optimum results; but, as with very dilute solutions, the best results are obtained when the concentration of cyanuric acid is greater than the concentration of available chlorine.

The stability of active chlorine solutions exposed to ultraviolet light also varies with the pH of the solution, but over the range from pH 6.5 to pH 8.5, the stabilizers of this invention are about equally effective in reducing the rate of available chlorine loss in solutions maintained at a concentration of about 1 p.p.m.

The stabilizer may be added to the solution in any desired fashion. It is conveniently added as cyanuric acid or one of its water soluble salts.

The mechanism of the protective action is not known, but it is believed that the cyanuric acid may form a relatively stable complex with hypochlorite and other forms of active chlorine, and that the radient energy absorbed by the hypochlorite is transferred to the cyanuric acid part of the complex and dissipated as heat, instead of decomposing the hypochlorite. In addition, the cyanuric acid may be adsorbed on the metal surfaces and form a protective film to reduce the activity of the metal in promoting the loss of available chlorine.

Whatever the action is, it does not result in decomposition of the cyanuric acid. Tests run over extended periods of time indicate that the chemical loss of cyanuric acid and the related compounds is negligible. This is apparently due to the great chemical stability of the basic ring of the compounds. Thus, only mechanical losses of solution need be considered in estimating the cyanuric acid requirement.

Example I.—Pool tests outside

As a typical example of the invention, a pair of pools, 6' long by 6' wide by 7' deep, were made of identical cement filled and coated cinder block, coated on the inside with the same waterproofing paint. The pools were filled to a depth of 6 feet, thus holding approximately 1800 gallons of water. The water was continuously circulated in each pool, at a rate of 5 gallons per minute, by plastic lined pumps and piping, from a point near the center bottom of the pool onto the surface. The active chlorine content of the pools was maintained at about 0.8 p.p.m. available chlorine and the pH at 7.4±0.2 by adding active chlorine material, and acid as needed, whenever the available chlorine dropped to 0.6, raising it to 1.0 p.p.m. The variable pool was operated with varying amounts of cyanuric acid, whereas the control pool was operated without any addition of cyanuric acid.

The following data were obtained, using sodium hypochlorite as the source of available chlorine:

| Weather Condition | Water Temp. | Cyanuric Acid Conc. in Variable Pool | Rate of Available Chlorine Loss, p.p.m./24 hours | | |
|---|---|---|---|---|---|
| | | | Variable Pool | Control Pool | Ratio |
| Sunny | 63-65 | 0 | 6.2 | 6.5 | 1.05 |
| Partly cloudy | 64-65.5 | 10 | 1.0 | 4.6 | 4.6 |
| Do | 65.5-67 | 10 | 1.4 | 5.6 | 4.0 |
| Sunny | 66.5-69 | 10 | 1.4 | 6.1 | 4.4 |
| Cloudy rain | 63.5 | 10 | 1.2 | 3.6 | 3.0 |
| Sunny | 64-65.5 | 50 | 0.4 | 5.4 | 13 |
| Cloudy | 61.5-63 | 50 | 0.4 | 4.1 | 10 |

In the last test, the circulating water of both pools passed through a four foot length of ½" galvanized iron pipe attached to the plastic pipe at the discharge end.

Replacement of the cyanuric acid by equivalent quantities of sodium and calcium cyanurates gives similar results.

Example II.—Laboratory tests with U.V. light

A laboratory test was made with zero chlorine demand water, using an ultraviolet lamp, maintaining the water at pH 7.4 and 1 p.p.m. available chlorine with sodium hypochlorite and HCl. The test in each case was run as follows: To 2,000 ml. of zero chlorine demand water was added sodium hypochlorite solution to give a concentration of about 1 p.p.m. available chlorine, and the pH was adjusted to 7.4. The beaker containing the solution was placed beneath an ultraviolet lamp and stirred continuously with a magnetic stirrer. 25-ml. aliquots were withdrawn at intervals and analyzed for available chlorine by a colorimetric ortho-tolidine method. When the available chlorine content had fallen to about 0.6 p.p.m., additions from a 1000-p.p.m. master solution were made to restore the available chlorine level to about 1 p.p.m. Tests were continued in this manner for 4 to 6 hours. Volume was maintained at 2,000 ml. by adding zero chlorine demand water each time a sample was removed for analysis. Rate of loss of available chlorine was determined from the analytical measurements. The following results were obtained:

| Cyanuric Acid Added (p.p.m.) | Rate of Available Chlorine Loss (p.p.m. per 24 hours) |
|---|---|
| 0 | 6.9 |
| 0.5 | 5.8 |
| 1.0 | 3.8 |
| 2.0 | 3.6 |
| 5.0 | 2.2 |
| 10 | 2.3 |
| 50 | 1.7 |
| 100 | 2.1 |

It will be noted that these laboratory tests give somewhat less advantage for the added cyanuric acid than a large scale test, indicating that the protective action of the cyanuric acid is even more effective under actual outdoor sunlight exposure than it is under the artificial laboratory U.V. exposure conditions.

Example III.—Variable pH

The procedure of Example II was followed except that the pH was maintained at several different levels with the following results:

| Cyanuric Acid Added (p.p.m.) | Rate of Available Chlorine Loss (p.p.m. per 24 hours) at— | | |
|---|---|---|---|
| | pH 6.5 | pH 7.4 | pH 8.5 |
| 0 | 4.8 | 6.9 | 9.3 |
| 10 | 1.0 | 2.3 | 2.9 |

This experiment indicates that cyanuric acid is an effective stabilizer over the entire range of pH encountered in swimming pools and in potable water supplies.

Example IV.—Ammelide and its salts

Example II was repeated, substituting ammelide for cyanuric acid, with the following results:

| p.p.m. Ammelide | Rate of Loss of Available Chlorine (p.p.m. per 24 hours) |
|---|---|
| 0 | 6.8 |
| 10 | 2.1 |

Similar results are obtained when the ammelide is replaced by its sodium salt.

Example V.—Laboratory test with iron and copper

The effect of added cyanuric acid on the rate of decomposition in the dark, in contact with iron and copper surfaces, was determined by adding 10 p.p.m. cyanuric acid to zero chlorine demand water, maintained at approximately pH 7.4 and 1 p.p.m. available chlorine with sodium hypochlorite and HCl as in Example II. A thin polished metal strip was suspended in the test solution. Available chlorine loss was determined as in Example II, with the following results:

| Metal in Water | Rate of Available Chlorine Loss, p.p.m. per 24 hours |
|---|---|
| Iron—No cyanuric acid | 7.7 |
| Iron—10 p.p.m. cyanuric acid | 2.1 |
| Copper—No cyanuric acid | 8.3 |
| Copper—10 p.p.m. cyanuric acid | 3.8 |

Example VI.—Control of available chlorine added as an active dichlorocyanurate When a compound such as sodium dichlorocyanurate is used to produce active chlorine in a swimming pool, some control of the loss is obtained by such cyanuric acid as is formed when the sodium dichlorocyanurate gives up its active chlorine. But added cyanuric acid greatly decreases this rate of loss. Thus, Example II was repeated, using sodium dichlorocyanurate as the source of active chlorine, with the following results:

| Cyanuric Acid Added, p.p.m. | Rate of Available Chlorine Loss, p.p.m. per 24 hours |
|---|---|
| 0 | 3.7 |
| 10 | 1.8 |

Example VII.—Stabilization of more concentrated solutions

Cyanuric acid acts to stabilize more concentrated solutions of active chlorine chemicals as well. Thus, using the technique of Example II, substantially more concentrated solutions were tested, maintaining pH at about 7.4 as therein described, but without adding additional active chlorine during the course of the test, which ran about 4 to 6 hours.

With a sodium hypochlorite solution with an original content of 5 p.p.m. available chlorine, the rate of loss without addition of cyanuric acid was 15.3 p.p.m. per 24 hours. 5 p.p.m. cyanuric acid cut the loss down to 6.1, 25 p.p.m. cut it down to 3.6.

With a sodium hypochlorite solution with an original available chlorine content of 10 p.p.m., available chlorine showed a loss rate of 26.7 p.p.m. available chlorine per 24 hours. 10 p.p.m. cyanuric acid reduced the loss to 12.0 p.p.m. per 24 hours. 50 p.p.m. cyanuric acid reduced the loss to such very low rate that it was impossible to determine accurately, but well below 2.0 p.p.m. per 24 hours.

With a similar solution initially containing 100 p.p.m. available chlorine, 100 p.p.m. cyanuric acid reduced the rate of loss from 213 p.p.m. available chlorine per 24 hours to 90 p.p.m. per 24 hours; increase of the cyanuric acid to 500 p.p.m. reduced the loss further to about 50 p.p.m. per 24 hours.

With a similar solution originally containing 1000 p.p.m. available chlorine, the loss was 788 p.p.m. per 24 hours unstabilized; 1000 p.p.m. cyanuric acid reduced the loss to 243 p.p.m. per 24 hours, while 2000 p.p.m. cyanuric acid reduced the loss to 92 p.p.m. per 24 hours. It is obvious that as the concentration of available chlorine increases, the ratio of the unstabilized loss per 24 hours to the initial concentration decreases. However, there is a marked advantage ever at 1000 p.p.m. available chlorine in using cyanuric acid in greater concentration than available chlorine.

The invention has its greatest utility in connection with the very low concentration available chlorine solutions used in swimming pools, not only because of the savings in the amounts of active chlorine and acid consumed, but also because the need for maintaining the available chlorine level puts a premium on anything which will reduce labor costs in maintaining that level. In this field, optimum results are obtained at about 2 to 50 p.p.m. cyanuric acid, with available chlorine levels at about 0.4 to 1.5 p.p.m. However, as indicated above, the invention can be used, where economic considerations indicate, in connection with more concentrated solutions.

Obviously, the specific examples shown are merely illustrations of the invention, and are not limiting thereto, the invention being defined by the claims. While the specific examples illustrate sodium hypochlorite and sodium dichlorocyanurate as the source of active chlorine, the invention is generally applicable to any source of active chlorine, including gaseous chlorine, the various hypochlorites and other active chlorine-yielding chemicals such as dichlorodimethyl hydantoin. As the source of stabilizers, even relatively water insoluble cyanurates and ammelide salts may be used, since concentrations of the order of 10 p.p.m. can be obtained with salts ordinarily considered insoluble. Salts of poisonous metals should, of course, be avoided; the preferred salts are those of the alkali and alkali earth metals.

What is claimed is:

1. The method of stabilizing an aqueous solution containing active chlorine against decomposition by ultraviolet light, and by contact with iron and copper, which comprises adding to the solution a compound selected from the group consisting of cyanuric acid, ammelide, and their salts, in greater weight concentration, expressed as acid, than the concentration of available chlorine in the solution.

2. The method of stabilizing an aqueous solution containing active chlorine against decomposition by ultraviolet light, and by contact with iron and copper, which comprises adding to the solution cyanuric acid in greater weight concentration than the concentration of available chlorine in the solution.

3. The method of stabilizing an aqueous solution containing active chlorine against decomposition by ultraviolet light, and by contact with iron and copper, which comprises adding to the solution a salt of cyanuric acid in greater weight concentration, expressed as acid, than the concentration of available chlorine in the solution.

4. The method of stabilizing an aqueous solution containing active chlorine against decomposition by ultraviolet light, and by contact with iron and copper, which comprises adding to the solution ammelide in greater weight concentration than the concentration of available chlorine in the solution.

5. The method of stabilizing an aqueous solution containing active chlorine against decomposition by ultraviolet light, and by contact with iron and copper, which comprises adding to the solution a salt of ammelide in greater weight concentration, expressed as acid, than the concentration of available chlorine in the solution.

6. In the operation of a water supply exposed to the action of ultraviolet light, in which an available chlorine level of about 0.4 to 1.5 p.p.m. is maintained by the addition thereto of an active chlorine chemical, the improvement which comprises adding to said water supply sufficient of a compound selected from the group consisting of cyanuric acid, ammelide, and their salts, to maintain a concentration of 2 to 50 p.p.m. of the compound expressed as acid, whereby the rate of loss of available chlorine is sharply reduced over a similar water supply not containing the added compound.

7. In the operation of a water supply exposed to the action of ultraviolet light, in which an available chlorine level of about 0.4 to 1.5 p.p.m. is maintained by the addition thereto of an active chlorine chemical, the improvement which comprises adding to said water supply sufficient cyanuric acid to maintain a concentration of 2 to 50 p.p.m., whereby the rate of loss of available chlorine is sharply reduced over a similar water supply not containing the added compound.

8. In the operation of a water supply exposed to the action of ultraviolet light, in which an available chlorine level of about 0.4 to 1.5 p.p.m. is maintained by the addition thereto of an active chlorine chemical, the improvement which comprises adding to said water supply sufficient of a salt of cyanuric acid to maintain a concentration of 2 to 50 p.p.m. of the salt expressed as acid, whereby the rate of loss of available chlorine is sharply reduced over a similar water supply not containing the added compound.

9. In the operation of a water supply exposed to the action of ultraviolet light, in which an available chlorine level of about 0.4 to 1.5 p.p.m. is maintained by the addition thereto of an active chlorine chemical, the improvement which comprises adding to said water supply sufficient ammelide to maintain a concentration of 2 to 50 p.p.m., whereby the rate of loss of available chlorine is sharply reduced over a similar water supply not containing the added compound.

10. In the operation of a water supply exposed to the action of ultraviolet light, in which an available chlorine level of about 0.4 to 1.5 p.p.m. is maintained by the addition thereto of an active chlorine chemical, the improvement which comprises adding to said water supply sufficient of a salt of ammelide to maintain a concentration of 2 to 50 p.p.m. of the salt expressed as acid, whereby the rate of loss of available chlorine is sharply reduced over a similar water supply not containing the added compound.

11. In the operation of a water supply exposed to the action of ultraviolet light, in which an available chlorine level of about 0.4 to 1.5 p.p.m. is maintained by the addition thereto of a hypochlorite, the improvement which comprises adding to said water supply sufficient of a compound selected from the group consisting of cyanuric acid, ammelide, and their salts, to maintain a concentration of 2 to 50 p.p.m. of the compound expressed as acid, whereby the rate of loss of available chlorine is sharply reduced over a similar water supply not containing the added compound.

12. The method of stabilizing an aqueous solution containing active chlorine against decomposition by ultraviolet light, and by contact with iron and copper, which comprises adding to the solution sodium cyanurate in greater weight concentration than the concentration of available chlorine in the solution.

13. The method of stabilizing an aqueous solution containing active chlorine against decomposition by ultraviolet light, and by contact with iron and copper, which comprises adding to the solution calcium cyanurate in greater weight concentration than the concentration of available chlorine in the solution.

14. The method of stabilizing an aqueous solution containing active chlorine against decomposition by ultraviolet light, and by contact with iron and copper, which comprises adding to the solution sodium ammelide in greater weight concentration than the concentration of available chlorine in the solution.

References Cited in the file of this patent

UNITED STATES PATENTS

| | | |
|---|---|---|
| 2,043,257 | Missbach | June 9, 1936 |
| 2,184,888 | Muskat | Dec. 26, 1939 |